US00RE37096E

(19) United States
(12) Reissued Patent
Houlihan

(10) Patent Number: US RE37,096 E
(45) Date of Reissued Patent: Mar. 20, 2001

(54) DIGITAL SPORTS WATCH CASING

(75) Inventor: John T. Houlihan, Southbury, CT (US)

(73) Assignee: Timex Corporation, Middlebury, CT (US)

(21) Appl. No.: 29/053,845

(22) Filed: Apr. 12, 1996

Related U.S. Patent Documents

Reissue of:
(64) Patent No.: Des. 345,926
Issued: Apr. 12, 1994
Appl. No.: 29/610,875
Filed: Nov. 9, 1990

(51) LOC (6) Cl. ..... 10 02
(52) U.S. Cl. ..... D10/30; D10/38
(58) Field of Search ..... D10/1–40, 122–132; 368/280–282, 276–277, 28–30, 285, 239–242, 82–84, 41–44

(56) References Cited

U.S. PATENT DOCUMENTS

| | | |
|---|---|---|
| D. 265,063 | 6/1982 | Iida . |
| D. 266,831 | 11/1982 | Iida . |
| D. 269,546 | 6/1983 | Rogers . |
| D. 270,243 | 8/1983 | Porsche . |
| D. 278,687 | 5/1985 | Guigiaro . |
| D. 279,273 | 6/1985 | Guigiaro . |
| D. 287,341 | 12/1986 | Grimes . |
| D. 323,993 | 2/1992 | Lee . |
| D. 330,166 | 10/1992 | Park . |
| D. 338,160 | 8/1993 | Houlihan . |
| D. 345,926 | 4/1994 | Houlihan . |
| 3,871,170 | 3/1975 | Bergey . |

OTHER PUBLICATIONS

Timex 1985 Catalog, p. 27: Style No. 62911.
Timex 1986 Catalog, p. 23: Style No. 60151, Style No. 62911, Style No. 63731.
Timex 1987 Catalog, p. 27: Style No. 60151, Style No. 60161, Style No. 62911, Style No. 63731.
Timex 1988 Catalog, p. 27, 31, 33, 34, Style No. 60151, Style No. 60161, Style No. 62911, Style No. 63731, Style No. M484/485, Foldout "Introducing–the New Timex Merchandising System".
Timex 1989 Catalog, p. 29, Style No. 82111.
Timex 1990 Catalog, p. 31, Style No. 60151, Style No. 60161, Style No. 82111, Style No. 62911, Style No. 63731, Style No. 85148.
U.S. application No. 08/631,349, Digital Sports Watch[D], John T. Houlihan, filed Nov. 9, 1990.
Best Catalog, 1986/87, see p. 97, item #14 (circled) upper left corner.

*Primary Examiner*—Martie K. Holtje
(74) *Attorney, Agent, or Firm*—Arthur G. Schaier

(57) CLAIM

The ornamental design for a digital sports watch *casing*, as shown and described.

DESCRIPTION

FIG. 1 is a front elevational view of a digital sports watch *casing*, showing my new design;
FIG. 2 is a left side elevational view;
FIG. 3 is a right side elevational view;
FIG. 4 is a top plan view;
FIG. 5 is a bottom plan view; *and,*
FIG. 6 is a rear elevational view[;] *thereof.*
[FIG. 7 is a front elevational view drawn to an enlarged scale with the band removed for convenience of illustration;]
[FIG. 8 is a top plan view of FIG. 7;]
[FIG. 9 is a bottom plan view of FIG. 7;]
[FIG. 10 is a left side elevational view of FIG. 7;]
[FIG. 11 is a right side elevational view of FIG. 7; and]
[FIG. 12 is a rear elevational view of FIG. 7.]

1 Claim, 2 Drawing Sheets

Figure 4:
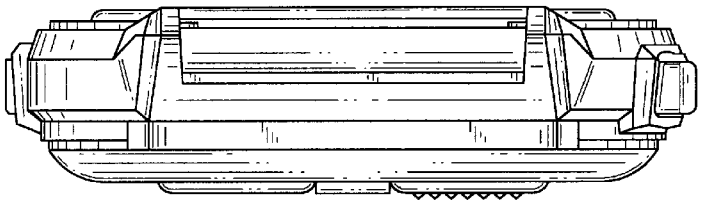
Figure 1:
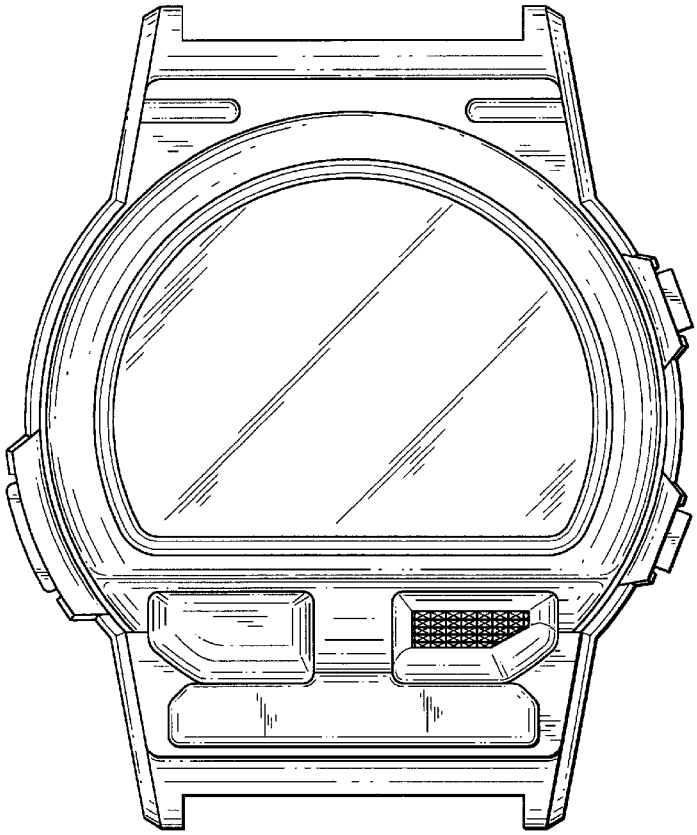
Figure 5:
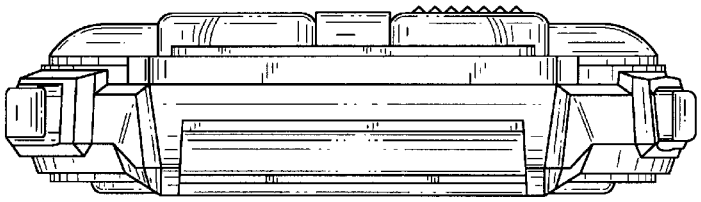
Figure 2:
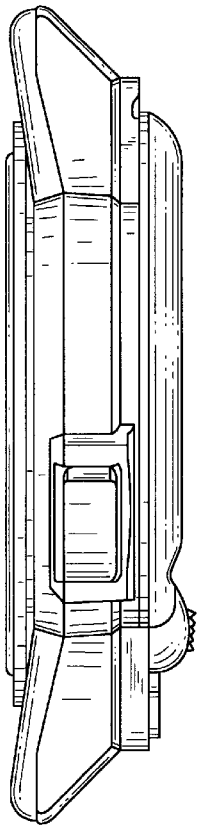
Figure 3:
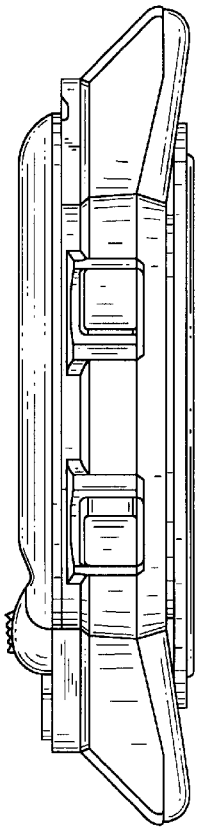
Figure 6:
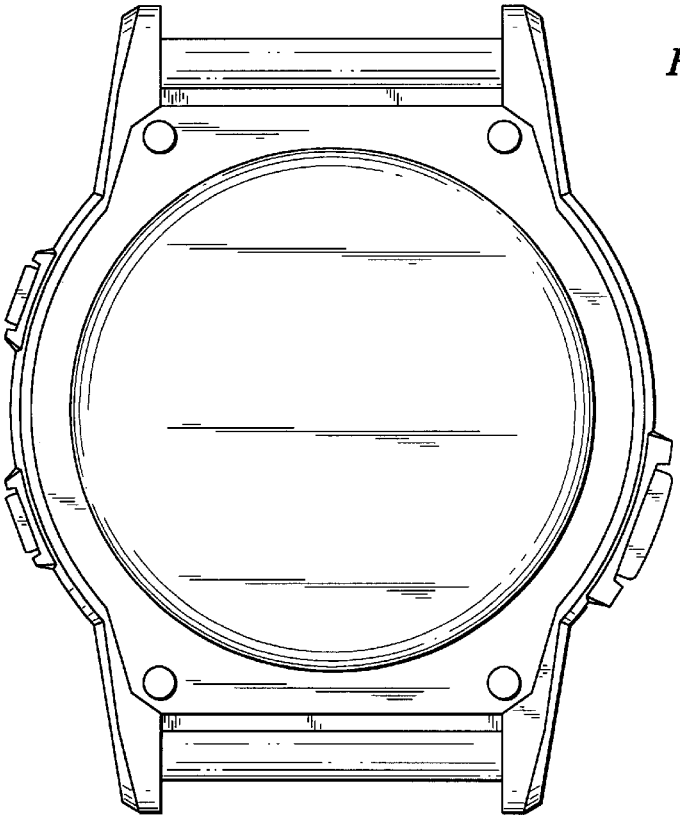

Matter enclosed in heavy brackets [ ] appears in the original patent, but forms no part of this reissue; matter printed in italics indicates the additions made by reissue.